United States Patent
Yamazaki

(10) Patent No.: US 7,206,830 B2
(45) Date of Patent: Apr. 17, 2007

(54) INFORMATION EQUIPMENT SYSTEM

(75) Inventor: Tsutomu Yamazaki, Sagamihara (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 888 days.

(21) Appl. No.: 09/768,570

(22) Filed: Jan. 25, 2001

(65) Prior Publication Data
US 2001/0013053 A1 Aug. 9, 2001

(30) Foreign Application Priority Data
Feb. 4, 2000 (JP) ............................ 2000-028276

(51) Int. Cl.
*G06F 15/173* (2006.01)
(52) U.S. Cl. .................. 709/223; 709/224; 710/15; 710/16; 710/18; 710/19
(58) Field of Classification Search .................. 709/224
See application file for complete search history.

(56) References Cited

U.S. PATENT DOCUMENTS

| | | | | |
|---|---|---|---|---|
| 5,611,050 A | * | 3/1997 | Theimer et al. | 709/202 |
| 5,625,757 A | * | 4/1997 | Kageyama et al. | 358/1.14 |
| 6,351,685 B1 | * | 2/2002 | Dimitri et al. | 700/214 |
| 6,452,692 B1 | * | 9/2002 | Yacoub | 358/1.15 |
| 6,470,387 B1 | * | 10/2002 | Fischer | 709/224 |
| 6,552,813 B2 | * | 4/2003 | Yacoub | 358/1.1 |
| 6,721,818 B1 | * | 4/2004 | Nakamura | 710/9 |

FOREIGN PATENT DOCUMENTS

| | | |
|---|---|---|
| JP | 07-311665 | 11/1995 |
| JP | 10-177533 | 6/1998 |
| JP | 10-333845 | 12/1998 |

\* cited by examiner

Primary Examiner—Bunjob Jaroenchonwanit
Assistant Examiner—Dohm Chankong
(74) Attorney, Agent, or Firm—Buchanan Ingersoll & Rooney PC

(57) ABSTRACT

A system where pieces of information equipment are connected via a network, including a memory unit and a compensating device. The memory unit stores position information that represents a physical position of each piece of information equipment. The compensating device compensates a physical distance from one piece of information equipment to another piece of information equipment based on the position information, according to a frequency of information exchange between the former and the latter.

21 Claims, 7 Drawing Sheets

FIG. 3

| EQUIPMENT \ COORDINATE | x | y |
|---|---|---|
| A | 10 | 15 |
| B | 30 | 15 |
| C | 40 | 15 |
| D | 30 | 30 |
| E | 10 | 10 |
| F | 50 | 15 |
| G | 20 | 10 |
| H | 20 | 15 |

FIG. 4

| | | PRINTER | | |
|---|---|---|---|---|
| | | F | G | H |
| COMPUTER | A | 10% | 30% | 60% |
| | B | 80% | 5% | 15% |
| | C | 90% | 5% | 5% |
| | D | 80% | 5% | 5% |
| | E | 10% | 60% | 30% |

FIG. 5

|  |  | PRINTER | | | | | |
|---|---|---|---|---|---|---|---|
|  |  | F | | G | | H | |
|  |  | PHYSICAL DISTANCE | LOGICAL DISTANCE | PHYSICAL DISTANCE | LOGICAL DISTANCE | PHYSICAL DISTANCE | LOGICAL DISTANCE |
| COMPUTER | A | 40.0 | 49.3 | 11.2 | 11.6 | 10.0 | 7.3 |
| | B | 20.0 | 10.7 | 11.2 | 14.3 | 10.0 | 11.8 |
| | C | 10.0 | 4.3 | 20.6 | 26.5 | 20.0 | 25.7 |
| | D | 25.0 | 13.3 | 22.4 | 28.7 | 18.0 | 21.3 |
| | E | 40.3 | 49.7 | 10.0 | 7.3 | 11.2 | 11.6 |

FIG. 6

|  |  | COMPUTER | | | | |
|---|---|---|---|---|---|---|
|  |  | A | B | C | D | E |
| PRINTER | F | 10% | 25% | 30% | 30% | 5% |
| | G | 30% | 5% | 4% | 1% | 60% |
| | H | 50% | 20% | 7% | 3% | 20% |

FIG. 7

| | | COMPUTER | | | | | | | | | |
|---|---|---|---|---|---|---|---|---|---|---|---|
| | | A | | B | | C | | D | | E | |
| | | PHYSICAL DISTANCE | LOGICAL DISTANCE | PHYSICAL DISTANCE | LOGICAL DISTANCE | PHYSICAL DISTANCE | LOGICAL DISTANCE | PHYSICAL DISTANCE | LOGICAL DISTANCE | PHYSICAL DISTANCE | LOGICAL DISTANCE |
| PRINTER | F | 40.0 | 49.3 | 20.0 | 21.7 | 10.0 | 10.3 | 25.0 | 25.8 | 40.3 | 51.7 |
| | G | 11.2 | 11.6 | 11.2 | 14.3 | 20.6 | 26.7 | 22.4 | 29.6 | 10.0 | 7.3 |
| | H | 10.0 | 8.3 | 10.0 | 11.3 | 20.0 | 25.3 | 18.0 | 23.5 | 11.2 | 12.7 |

INFORMATION EQUIPMENT SYSTEM

This application is based on Japanese Patent Application No. 2000-28276 filed on Feb. 4, 2000, the contents of which are hereby incorporated by reference.

BACKGROUND OF THE INVENTION

1. Field of the Invention

The present invention relates to a system consisting of a plurality of pieces of information equipment connected to a network, a method for controlling a plurality of pieces of information equipment, and a computer readable recording medium for storing a program that controls a plurality of pieces of information equipment.

2. Description of the Related Art

While local area networks (LANs) are becoming popular these days where users can upload or download information through users' computers, various environments have also into being where users can exchange data freely through various information equipment such as computers and printers.

It is generally easy to control one or two information equipment. However, if it is intended to control a large number of equipment connected to a network under such an environment, it is not only cumbersome to control each unit of information equipment but also affects the efficiency of office works due to distributed existences of these units.

If the control of the information equipment is not well established, a complicated circumstance can occur. For example, when a user is to print a document which the user generated using a computer, it may so happen that the document may be printed not by a printer nearby but by a printer far away, and it may cause the user to walk a long way to pick it up.

Therefore, techniques have been proposed recently to select automatically a printer that is physically closer to a user by means of using a computer or a control server that stores position information of information equipment in order to print documents for the user. They are, for example, Publications of Unexamined Japanese Patent Application, JP-A-10-177533 and JP-A-10-333845.

However, the techniques disclosed by these publications may still present a problem if the automatically selected printers are located on the other side of a wall or a long table. In other words, a printer that is located at a shortest distance from the user may not necessarily be the easiest one to access as the user has to go around the wall or table.

Another Publication of Unexamined Japanese Patent Application JP-A-7-311665 discloses different technology that uses a usage history memory unit that stores the frequencies of various printers by a particular user. According to this technology, when it is impossible to select one from printers available as a destination of output based on the functions and printing conditions of the printers, the most frequently used printer will be selected for printing based on the data stored in the usage history memory unit.

However, this technology is simply adding the usage frequency as a criterion of selection of a printer in addition to such criteria as printer function and printing condition. Therefore, it causes a problem when a certain printer is used more often than others due to its printer functions, etc. For example, in case of a printing job that can be printed by several printers since its printing requirement level is low, the system may select a printer further away simply because it has been used more often than others although there is a printer that can be used for the job, which is located closer to the user.

SUMMARY OF THE INVENTION

It is an object of the present invention to a computer connected with a plurality of printers via a network, including a memory unit and a compensating means. The memory unit stores distance information from the computer to each printer. The compensating means compensates the distance information stored in the memory unit according to a number of times each printer received a printing job from the computer.

A further object of the invention is to provide an information equipment system including a plurality of printers and computers connected to a network, a setup means and a display means. The setup means sets up an order of priority based on a distance between each printer and each computer as well as on usage frequency between each printer and each computer. The display means displays a printer selection screen in a display format based on the order of priority set up when selecting a printer.

Still a further object of the invention is to provide an information equipment system including a plurality of printers and computers connected to a network, a setup means and a selection unit. The setup means sets up an order of priority based on a distance between each printer and each computer as well as on usage frequency between each printer and each computer, and the selection unit automatically selects a printer based on the order of priority set up.

Still a further object of the invention is to provide a method of allowing a computer to control a printer to output a printing job in a system where a plurality of printers and computers are connected via a network.

The method includes the steps of obtaining distance information from each computer to each printer, compensating the obtained distance information according to a number of times each printer received a printing job from each computer, and setting up an order of priority for the printers based on the compensated distance information.

Alternatively, the method includes the steps of obtaining distance information from each computer to each printer, compensating the obtained distance information according to a number of times each printer received a printing job from each computer, and selecting a printer to be used for outputting a printing job from a plurality of printers based on the compensated distance information.

Still a further object of the invention is to provide an information equipment system where a plurality of pieces of information equipment are connected via a network, including a memory unit and a compensating means. The memory unit stores position information that represents a physical position of each piece of information equipment. The compensating means compensates a physical distance from one piece of information equipment to another piece of information equipment based on the position information, according to a frequency of information exchange between the former and the latter.

Still a further object of the invention is to provide a computer readable recording medium in which a program for controlling a plurality of pieces of information equipment connected via a network is stored. The program causes the computer to executing the processes of storing position information that represents a physical position of each piece of information equipment, and compensating a physical distance from one piece of information equipment to another piece of information equipment based on the position information, according to a frequency of information exchange between the former and the latter.

The objects, characteristics, and advantages of this invention other than those set forth above will become apparent from the following detailed description of the preferred embodiments, which refers to the annexed drawings.

BRIEF DESCRIPTION OF THE DRAWINGS

FIG. 3 shows a position coordinate table that stores the position coordinates of computers and printers;

FIG. 4 is a usage frequency table of each printer seen from the standpoint of each computer;

FIG. 5 is a table combining a physical distance table and a logical distance table of the printers seen from the standpoint of each computer;

FIG. 6 is a usage frequency table of each computer seen from the standpoint of each printer;

FIG. 7 is a table combining a physical distance table and a logical distance table of the computers seen from the standpoint of each printer;

DETAILED DESCRIPTION OF THE EMBODIMENTS

The embodiments of this invention will be described below with reference to the accompanying drawings.

Figure 1:
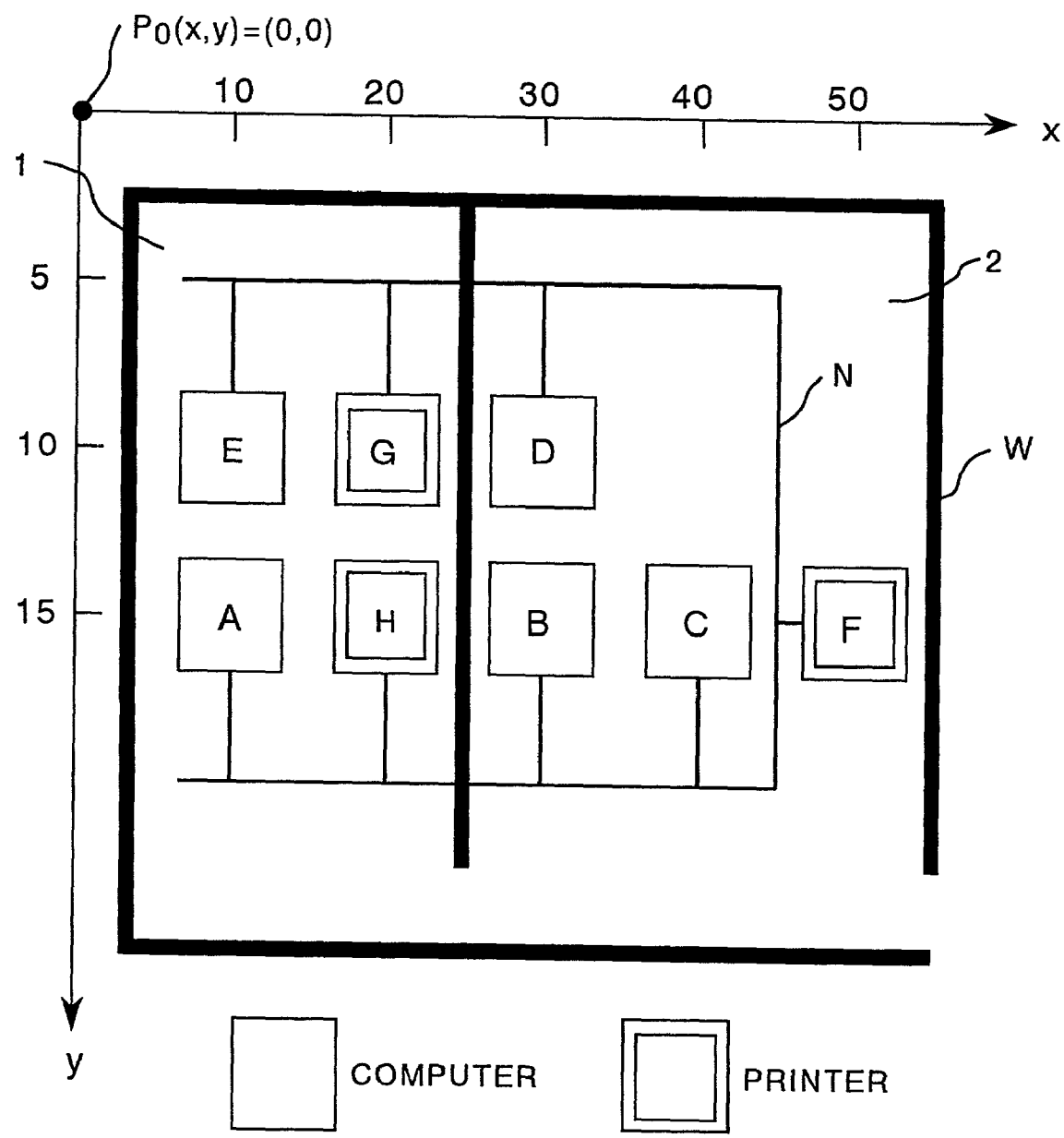
FIG. 1 is a schematic plan view of an information equipment system according to an embodiment of the invention.

FIG. 1 is a schematic plan view of an information equipment system according to an embodiment of the invention. The information equipment system consists of a plurality of pieces of information equipment A–H connected to a network N. These information equipment include personal computers A–E that serve as printing job transmission devices and printers F–H that serve as printing job executing devices, all of which are capable of sending or receiving data through via the network N.

The printing job transmission devices are not limited to said personal computers A–E but also can be workstations, portable computers, scanners and other information terminals. The printing job executing devices or printing devices are not limited to said printers F–H but also can be copying machines and facsimile machines. Moreover, the network N is not limited to a wired type but can be a wireless type such as a wireless LAN system.

The information system is installed encompassing two rooms 1 and 2, which are divided by a wall W such as a partitioning board. The computers A and E as well as printers G and H are installed in the room 1, and the computers B, C and D as well as the printer F are installed in the room 2.

Figure 2:
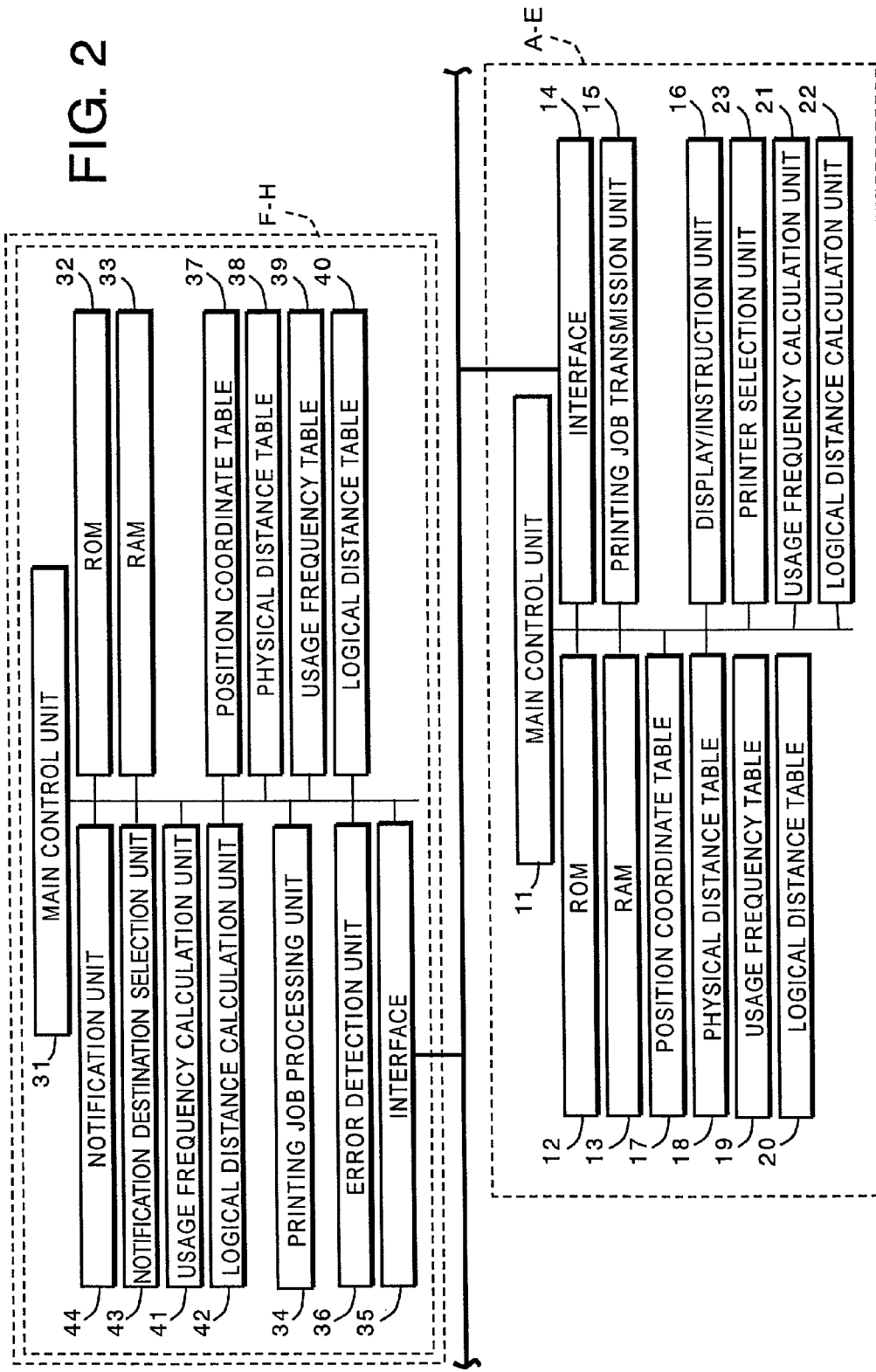
FIG. 2 is a block diagram showing the internal structures of a computer and a printer of the information equipment system.

FIG. 2 is a block diagram showing the internal structures of a computer and a printer of the information equipment system. Each of the computers A–E is equipped with a main control unit 11, a ROM 12, a RAM 13, an interface 14, a printing job transmission unit 15 and a display/instruction unit 16. The main control unit 11 controls the entire computer. The ROM 12 stores the prepared specific programs.

The RAM 13 stores the data temporarily. The interface 14 is used for transmitting printing jobs to the printers F–H as well as for transmitting or receiving commands and data between the printers F–H and computers A–E. The printing job transmission unit 15 transmits prepared printing jobs. The display/instruction unit 16 is use to display various information or for the user to issue instructions.

Each of the computers A–E has a memory area where a position coordinate table 17, a physical distance table 18, a usage frequency table 19 and a logical distance table 20 are stored.

FIG. 3 shows the position coordinate table 17 where the position coordinates of the computers and printers are stored. The position coordinate table 17 is a table where the position coordinates (x, y) of all information equipment, or the computers A–E and the printers F–H are stored. The origin of the coordinates (x, y) is the reference point $P_0(x, y)=(0, 0)$, which is shown in FIG. 1. The reference point $P_0$ can be set up at an arbitrary point. The unit distance of the position coordinate (x, y) can be arbitrarily set up.

Each of the computers A–E interconnected on the network N has a position coordinate table 17. The position coordinate table 17 may be prepared by the user manually entering the position coordinates of the information equipment A–H. However, the position coordinate table 17 can also be prepared by scanning the layout drawing of the office where the information equipment A–H are installed, or by detecting the locations of the information equipment A–H by means of sensors that are not shown in the drawing.

FIG. 4 shows the usage frequency table 19 that stores the usage frequency of each printer seen from the standpoint of each computer. The usage frequency table 19 is used for storing the usage frequency of each printer expressed in the number of times of printing jobs outputted by each printer in terms of the percentage of the entire number of printing jobs transmitted by each computer. The usage frequency table 19 is prepared by the usage frequency calculation unit 21 provided in each of the computers A–E.

From FIG. 4, it can be seen that the computer B transmitted 80% of the printing jobs to the printer F, 5% to the printer G, and 15% to the printer H. The total of the usage frequencies of the printers F, G, and H is 100%.

Moreover, the computer B, for example, is required to be equipped with at least the information in the column of the computer B of the usage frequency table 19 shown in FIG. 4. However, each of the computers A–E or the information equipment A–H may have the entire usage frequency table 19.

FIG. 5 shows a table combining the physical distance table 18 and the logical distance table 20 of the printers seen from the standpoint of each computer. The physical distance table 18 is a table that stores the physical straight line distance from each computer to each printer. Therefore, the physical distance table 18 can be calculated in advance from the position coordinate table 17.

For example, the physical distance BH from the computer B to the printer H can be calculated from the following formula assuming the position coordinate of the computer B be (Bx, By) and the position coordinate of the printer H be (Hx, Hy):

$$BH=((Bx-Hx)^2+(By-Hy)^2)^{1/2}$$

Substituting the corresponding values from the position coordinate table 17 into the above formula, the physical distance BH is obtained as follows:

$$BH=((30-20)^2+(15-15)^2)^{1/2}=10$$

The logical distance table 20 is used for storing the logical distances obtained by compensating the physical distances of the physical distance table 18. The compensation is executed according to the frequency each computer caused each printer to print.

The physical distance table 18 may be provided as an ancillary table to the position coordinate table 17. Also, the physical distance table 18 may be configured in such a way as to be temporarily generated in the course of obtaining the logical distance table 20, or to be erased after the logical distance table 20 is generated. This goes the same with the physical distance table 38 as mentioned below.

The logical distance table 20 is generated by the logical distance calculation unit 22, which is provided in each of the computers A–E, using the physical distance table 18 and the usage frequency table 19.

More specifically, the logical distance LBH from the computer B to the printer H is calculated according to the formula below using the physical distance BH mentioned above and a factor k. The factor k becomes smaller, i.e., has a tendency to reduce the logical distance, as the usage frequency of a specific printer seen from a specific computer becomes higher.

$$LBH = k \times BH$$

Also, the factor k can be calculated for the formula below assuming the frequency of usage of a specific printer seen from a specific computer is ρ, and the total number of printers in the particular information equipment system is n. The frequency of the usage ρ is a ratio that is expressed in percentage in the usage frequency table 19 converted into decimal or fraction.

$$k = 1 - (\rho - (1/n))$$

Therefore, substituting the values shown in the physical distance table 18 and the usage frequency table 19 into the above formula, the logical distance LBH from the computer B to the printer H can be calculated as shown below.

$$k = 1 - (0.15 - (1/3)) \approx 1.18$$

$$LBH \approx 1.18 \times 10 = 11.8$$

The method of compensating the physical distance with the above formula using the factor k is just an example, and can be arbitrarily changed.

The display/instruction unit 16 provided for each of the computers A–E, displays the codes such as names and IP addresses that identify the printers that are in printable conditions in the order of closeness to the user based on logical distances as compensated distances to the printers. Moreover, the display/instruction unit 16 also functions as the instruction unit with which the user selects the printer for executing the printing job.

Each of the computers A–E also has a printer selection unit 23. The printer selection unit 23 automatically selects the printer, in printable conditions, that is closest to the computer the user is using, i.e., closest in terms of the logical distance to the computer, referencing the logical distance table 20. The user can manually or automatically set up the printer where the printing job is to be executed. Manual setup means for the user to specify the printer by himself using the display/instruction unit 16, while automatic setup means to let the printer selection unit 23 to select it automatically.

As shown in FIG. 2, each of the printers F–H is equipped with a main control unit 31, a ROM 32, a RAM 33, a printing job processing unit 34, an interface 35 and an error detection unit 36. The main control unit 31 controls the entire printer. The ROM 32 stores the prepared program. The RAM 33 stores the received printing job temporarily. The printing job processing unit 34 prints the image data on paper according to the contents of the printing job. The interface 35 is used to receive printing jobs from the computers A–E and to transmit/receive commands and data between the computers A–E and the printers F–H. The error detection unit 36 detects errors such as out-of-paper and jamming.

Each of the printers F–H is also equipped with a memory area for storing a position coordinate table 37, a physical distance table 38, a usage frequency table 39, and a logical distance table 40.

The position coordinate table 37 has exactly the same contents as the position coordinate table 17 provided at each of the computers A–E. Specifically, the printers F–H connected to the network N contain the position coordinate table with the same contents as that of the computers A–E.

FIG. 6 shows the usage frequency table 39 that stores the usage frequency of each computer seen from the standpoint of each printer. The usage frequency table 39 is used for storing the usage frequency expressed by the number of jobs received from each computer in terms of the percentage of the entire number of printing jobs each printer received. The usage frequency table 39 is prepared by the usage frequency calculation unit 41 provided in each of the printers F–H.

From FIG. 6, it can be seen that the printer F received 10% of the printing jobs from the computer A, 25% from the computer B, 30% from the computer C, 30% from the computer D, and 5% from the computer E. The total of the usage frequencies of the computers A, B, C, D, and E is 100%.

Moreover, the printer F, for example, is required to be equipped with at least the information in the column of the printer F of the usage frequency table 39 shown in FIG. 6. However, each of the printers F–H or the information equipment A–H may have the entire usage frequency table 39.

FIG. 7 shows a table combining the physical distance table 38 and the logical distance table 40 of the computers seen from the standpoint of each printer. The physical distance table 38 is a table that stores the physical straight line distance from each printer to each computer. Therefore, the physical distance table 38 can be calculated in advance from the position coordinate table 37 in a method similar to the one used in calculating the physical distance table 18.

The logical distance table 40 is used for storing the logical distances obtained by compensating the physical distances of the physical distance table 38. The compensation is executed according to the frequency of printing jobs each printer received from each printer.

The logical distance table 40 is generated by the logical distance calculation unit 42, which is provided in each of the printers F–H, using the physical distance table 38 and the usage frequency table 39. Since the method of generating the logical distance table 40 is similar to that of the logical distance table 20, its description is not repeated here.

Each of the printers F–H is also equipped with a notification destination selection unit 43 and a notification unit 44 as shown in FIG. 2. The notification destination selection unit 43 automatically selects a computer, which is closest, i.e., closest in terms of the logical distance, to the particular printer, and which is ready to receive information referencing the logical distance table 40. The notification unit 44 notifies the computers specific information such as error information from the printers.

Figure 8:
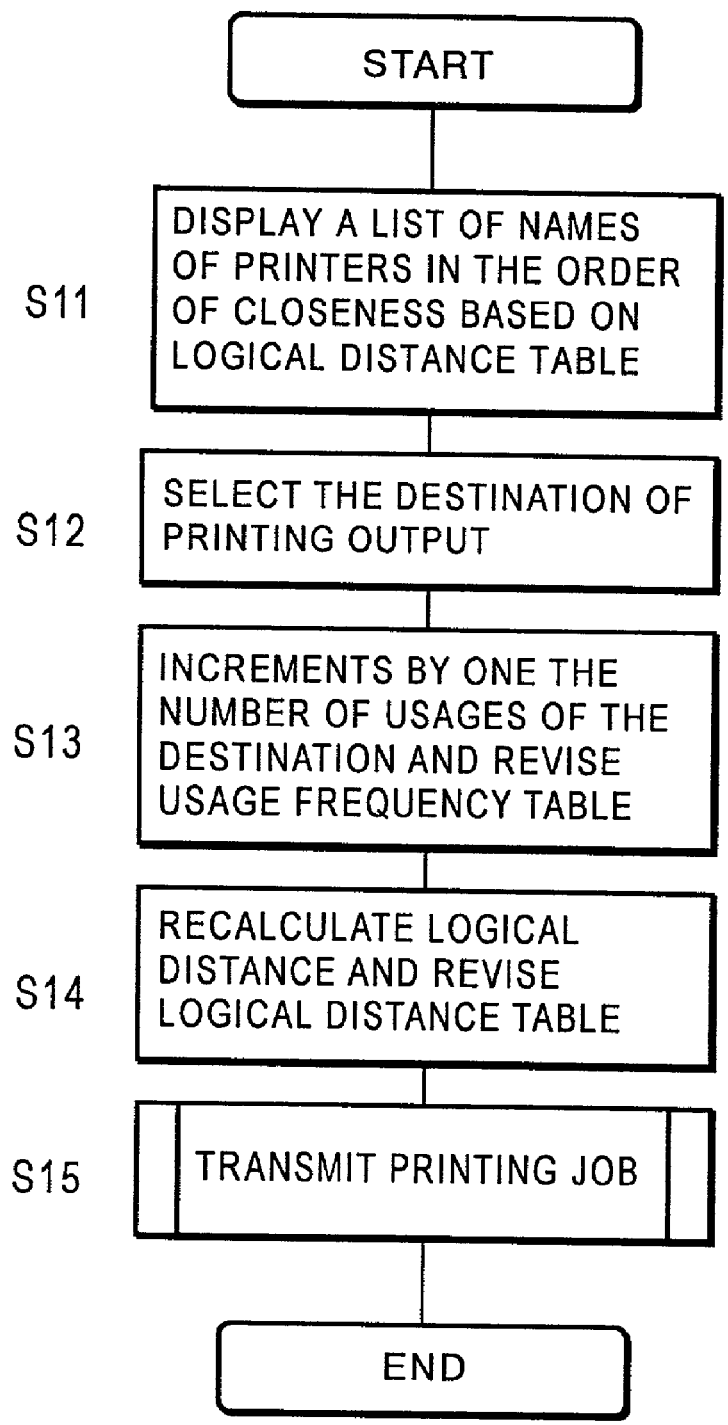
FIG. 8 is a flow chart that shows the process for transmitting a printing job.

Next, the operation of the information equipment system is described. FIG. 8 is a flow chart showing the process of transmitting printing jobs. It is assumed here that the user sets, with operating the display/instruction unit 16, information that a printer for executing the printing job is to be selected manually by the user.

First, when the user is ready to transmit a particular printing job from the computer B to a printer, the display/instruction unit 16 displays information such as a list of the names of printers that are ready to print in the order of closeness from the computer B based on the logical distance table 20 shown in FIG. 5 (step S11). The judgment whether it is printable includes the judgment of whether items such as printer function and printing condition match with the contents of the printing job.

When a printing job is to be transmitted from the computer B, the display/instruction unit 16 displays a list of the names of the printer F, printer H, and printer G in the order of shorter logical distances based on FIG. 5. If the names are listed in the order of shorter physical distances, they are the printer H, printer G, and printer F.

The logical distance is obtained by compensating the physical distance of the physical distance table 18 based on the frequency of printing jobs each computer caused each printer to print as stated above. Therefore, it is possible to obtain the position information for each of the printers F–H that are connected to the network N closer to the reality in consideration of the layout. Consequently, it is possible to control a plurality of printers F–H efficiently and to improve the productivity when the user operates the information equipment.

Next, the user selects the closest printer, or the printer F, which is the closest in terms of logical distance among the listed printers, F, H, and G, as the destination of the printing job transmission, i.e., the printing output with the help of the display/instruction unit 16 (step S12).

For example, the printer H, which is physically close to the computer B, is far from the computer B based on the logical distance as it is installed on the other side of the wall W. Therefore, the user can avoid an inadvertent selection of the printer H, which is physically the closest but far away from a practical standpoint, by making a selection based on the logical distance. In other words, the user can avoid the inconvenience of having to make a big circle around the wall to pickup the printed document. The user can also select the destination of the printing job transmission based on the physical destination table 18 if the user so wishes, so that a most appropriate and error-free selection becomes possible.

The usage frequency calculation unit 21 increments by one the number of usages of the printer F where the printing job is being transmitted each time a transmission occurs, recalculates the usage frequency and revises the usage frequency table 19 (step S13). Moreover, the logical distance calculation unit 22 recalculates the logical distance using the usage frequency table 19 and revises the logical distance table 20 (step S14).

For example, the user of the computer B tends to shy away from the use of the printer H in order to avoid the inconvenience of going around the obstacle to pick up printed documents. Consequently, the more the information equipment system is used, the more the usage frequency of the printer H seen from the computer B drops. In other words, the logical distance becomes closer to the position information of the reality as it is revised.

The printing job transmission unit 15 transmits the printing job to the printer F which is instructed by the display/instruction unit 16 (step S15).

Next, the operation of the automatic selection is described. Specifically, it is a case where it is assumed that the printer selection unit 23 is set up for automatically selecting the printer to be used for executing the printing job.

First, when the user is ready to transmit a particular printing job from the computer B to a printer, the printer selection unit 23 automatically selects a printer, which is closest to the computer B and is ready to print, based on the logical distance table 20. Next, the operations similar to the abovementioned steps S13 through S15. Therefore, it saves the operator's labor and improves the productivity.

It is also possible to notify the user that the printer selected to be the closest printer based on the logical distance table 20 is in fact too far, if it happens to have a logical distance greater than a specified threshold value. By doing so, it becomes possible for the user to choose to let the printer execute the printing job despite the warning message, or select another printer on his own decision rather than on the logical distance table, or to let the system choose a closer printer by changing the printing condition.

It is also possible to preset the method of selecting a printer where the printing job is to be executed based on the logical distance table 20. Specifically, it is possible to fix the setup in advance either for the user to manually select, using the display/instruction unit 16, the printer to be used for executing a particular printing job, or for the printer selection unit 23 to select the printer automatically.

Figure 9:
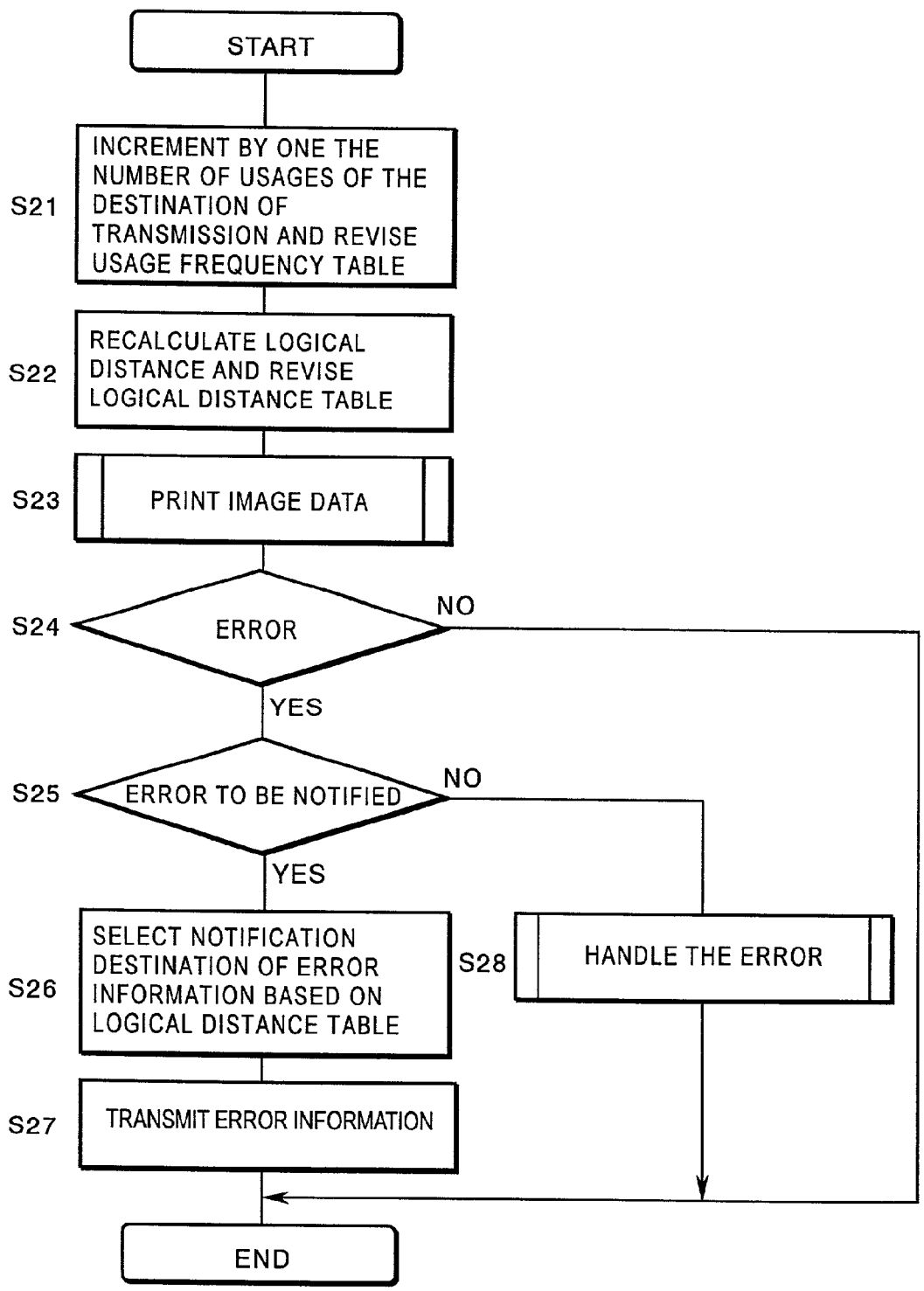
FIG. 9 is a flowchart that shows the process for receiving a printing job.

FIG. 9 is a flowchart showing the process of receiving the printing job.

For example, when the printer F receives a printing job from the computer B, the usage frequency calculation unit 41 increments by one the number of usages of the computer B, from which the printing job was transmitted, recalculates the usage frequency and revises the usage frequency table 39 (step S21). The logical distance calculation unit 42 recalculates the logical distance using the revised usage frequency table 39 and revises the logical distance table 40 (step S22).

Next, the printing job processing unit 34 prints the image data on paper according to the contents of the printing job (step S23).

If the error detection unit 36 detects an error such as out-of-paper or jamming during a printing operation (step S24: YES), the error detection unit 36 determines whether the error is a kind of error that needs to be notified to the user (step S25).

If the error is such that causes a problem in the execution of the printing operation such as paper jamming, i.e., an error that the user should be notified of (step 5: YES), the notification destination selection unit 43 automatically selects the computer C that is closest to the printer F referencing the logical distance table 40 (step S26).

The notification unit 44 transmits the error information detected by the error detection unit 36 to the computer C selected by the notification destination selection unit 43 (step S27).

Thus, when an error, of which the user should be notified, occurs in a printer while it is printing, a user who is practically closest to the printer will be notified of the error. As a result, it is possible to quickly service the printer where the error has occurred and to improve the productivity of the entire information equipment system.

The notification unit 44 is of course capable of transmitting the information of the error detected by the error detection unit 36 to the computer B, which is the source of the printing job transmission. Moreover, it is also possible to select the transmission destination of the error information based on both of the total number of printed sheets of printing job and the logical distance. For example, if the total number of printed sheets is greater than the predetermined value, it is possible to notify the user of the computer B, which is the source of transmission of the printing job.

On the other hand, if the detected error is not the kind that the user should be notified of (step S25: NO), the error will be handled by the printer itself (step S28).

As can be seen from the above, the embodiment provides a method of obtaining position information, which is closer to the reality in consideration of the layout, concerning a plurality of pieces of information equipment connected to a network. Consequently, it is capable of controlling a plurality of pieces of information equipment efficiently and improving the productivity when users use the information equipment.

A printing device installed on the other side of a wall is far away from a printing job transmission device based on the logical distance even though it is physically close to it. Therefore, the user can avoid an inadvertent selection of the printing device, which is physically the closest but far away from a practical standpoint, by making a selection based on the logical distance. Thus, the user can avoid the inconvenience of having to make a big circle around the wall to pick up the printed document.

When it is setup to select the printer automatically, the embodiment saves the work of the user, and improves the productivity. On the other hand, if it is setup for the user to select the transmission destination of the printing job, the user can make a most appropriate and error-free selection as he wishes. Moreover, the user can select a printer knowingly neglecting the warning message, or select another printer on his own decision rather than on the logical distance table, or to let the system choose a closer printer by changing the printing condition.

If an error occurs in a printer that could cause problems in printing, it is capable of notifying the user located closest to the printer from the practical standpoint in doing the necessary maintenance. This makes it possible to perform the maintenance quickly and improve the productivity of the entire information equipment system.

It is obvious that this invention is not limited to the particular embodiments shown and described above but may be variously changed and modified without departing from the technical concept of this invention.

For example, the tables 17 through 20, 37 through 40, the calculation units 21, 22, 41, and 42, and the selection units 23 and 43 are built into each piece of information equipment, i.e., printing job transmission device or printing device, as functions. However, those parts, 17 through 23 and 37 through 43, should not be limited to this style, but rather can be connected as separate auxiliary units of each pieces of the information equipment.

Since said parts 17 through 23 and 37 through 43 are built into each piece of information equipment, i.e., printing job transmission device or printing device, they do not require any particular installation space and have an advantage in that it is relatively convenient to retrofit or rearrange the parts. However, it is also possible to install said parts 17 through 23 and 37 thorough 43 on a control server, which is connected to the network N. This makes it possible to have a centralized control over the information equipment system.

A plurality of pieces of information equipment are controlled by the main control units 11 and 31, which execute the specific programs containing the abovementioned process sequences as shown in FIG. 8 and FIG. 9. The programs may be provided by computer readable recording media, for example, flexible disks and CD-ROMs.

The programs may be provided as application software that executes various processes mentioned above, or provided being built into the information equipment A–H or the control server as functions.

What is claimed is:

1. A computer connected with a plurality of printers via a network, comprising:
    a memory unit for storing physical distance information indicating a physical distance from the computer to each printer; and
    a compensating means for obtaining logical distance information indicating a logical distance from the computer to each printer by compensating the physical distance information according to usage of each printer, wherein the logical distance of each printer decreases as the usage frequency increases.

2. A computer as claimed in claim 1, further comprising a display means for displaying a print setup screen in a display format based on an order of priority according to logical distance.

3. A computer as claimed in claim 1, further comprising a setup means for automatically setting up a closest printer among the logical distance when outputting a printing job from the computer.

4. An information equipment system comprising:
    a plurality of printers and computers connected to a network;
    a setup means for selling up an order of priority based on a logical distance as a function of physical distance between each printer and each computer and usage frequency between each printer and each computer; and
    a display means for displaying a printer selection screen in a display format based on the order of priority set up when selecting a printer, wherein
    the logical distance assigned to each combination of printer and computer decreases as the usage frequency increases therebetween.

5. An information equipment system comprising:
    a plurality of printers and computers connected to a network;
    a setup means for setting up an order of priority based on a logical distance as a function of physical distance between each printer and each computer and usage frequency between each printer and each computer; and
    a selection unit for automatically selecting a printer based on the order of priority set up, wherein
    the logical distance assigned to each combination of printer and computer decreases as the usage frequency increases therebetween.

6. A method of allowing a computer to control a printer to output a printing job in a system where a plurality of printers and computers are connected via a network, comprising the steps of:
    obtaining physical distance information indicating a physical distance from each computer to each printer;
    obtaining logical distance information indicating a logical distance from the computer to each printer by compensating the obtained physical distance information according to usage frequency of each printer, wherein the logical distance of each printer decreases as the usage frequency increases; and
    setting up an order of priority for the printers based on the logical distance.

7. A method as claimed in claim 6, further comprising a step of displaying a printer selection screen according to the order of priority set up.

8. A method of allowing a computer to control a printer to output a printing job in a system where a plurality of printers and computers are connected via a network, comprising the steps of:
  obtaining physical distance information from each computer to each printer;
  obtaining a logical distance by compensating the obtained physical distance information according to a number of times each printer received a printing job from each computer; and
  selecting a printer to be used for outputting a printing job from a plurality of printers based on the logical distance, wherein
  the logical distance assigned to each combination of printer and computer decreases as the usage frequency increases therebetween.

9. An information equipment system where a plurality of pieces of information equipment are connected via a network, comprising:
  a memory unit for storing position information that represents a physical position of each piece of information equipment; and
  a compensating means for obtaining a logical distance by compensating a physical distance from one piece of information equipment to another piece of information equipment based on the position information, according to a frequency of information exchange between the former and the latter wherein, the logical distance decreases as the frequency of information exchange therebetween increases.

10. An information equipment system as claimed in claim 9, in which said information equipment includes a printing job transmission device for transmitting a printing job and a printing device for executing the printing job, said memory unit and said compensating means are provided in said printing job transmission device, and the transmitted printing job is executed by said printing device that is ready to print and closest to said printing job transmission device based on the logical distance.

11. An information equipment system as claimed in claim 9, in which said information equipment includes a printing job transmission device for transmitting a printing job and a printing device for executing the printing job, and if a printing device, which is ready to print and closest to a printing job transmission device that transmitted a printing job based on the logical distance, is more distant than a specified threshold value from said printing job transmission device, a message stating said printing device is too far is issued to said printing job transmission device.

12. An information equipment system as claimed in claim 9, in which said information equipment includes a printing job transmission device for transmitting a printing job and a printing device for executing the printing job, said memory unit and said compensating means are provided in said printing job transmission device, and said information equipment system further comprises an instruction unit with which a user can selects a printing device.

13. An information equipment system as claimed in claim 9, in which said information equipment includes a printing job transmission device for transmitting a printing job and a printing device for executing the printing job, said memory unit and said compensating means are provided in said printing device, and if an error occurs in said printing device that causes troubles in printing operation, said error information shall be issued to a printing job transmission device that is ready to receive information and is closest to said printing device based on the logical distance.

14. A computer readable recording medium in which a program for controlling a plurality of pieces of information equipment connected via a network is stored, said program causing the computer to executing the processes of:
  storing position information that represents a physical position of each piece of information equipment; and
  obtaining a logical distance by compensating a physical distance from one piece of information equipment to another piece of information equipment based on the position information, according to a frequency of information exchange between the former and the latter wherein, the logical distance decreases as the frequency of information exchange therebetween increases.

15. A computer as claimed in claim 1, wherein said compensating means revising the logical distance each time the printing job is received from the computer.

16. An information equipment system according to claim 4, wherein said setup means revising the order of priority of each time a printing job is received by one of the printers.

17. An information equipment system according to claim 5, wherein said setup means revising the order of priority of each time a printing job is received by one of the printers.

18. A method according to claim 6, further comprising the steps of compensating the obtained physical distance information each time the printing job is received from one of the computers and revising the order of priority for the printers each time the printing job is received.

19. A method according to claim 8, further comprising the step of compensating the obtained physical distance information each time the printing job is received from each computer.

20. An information equipment system according to claim 9, wherein said compensating means compensating the physical distance each time information is exchanged.

21. An information equipment system according to claim 14, wherein said compensating means compensating the physical distance each time information is exchanged.

* * * * *